United States Patent
Ho et al.

(10) Patent No.: US 11,524,789 B2
(45) Date of Patent: Dec. 13, 2022

(54) ALTERNATE FRESH AIR COMPRESSOR INTAKE FOR ENVIRONMENTAL CONTROL SYSTEM

(71) Applicant: Hamilton Sundstrand Corporation, Charlotte, NC (US)

(72) Inventors: Tony Ho, Glastonbury, CT (US); Louis J. Bruno, Ellington, CT (US); Donald E. Army, Enfield, CT (US); David Anderson, Jr., Enfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 198 days.

(21) Appl. No.: 16/218,156

(22) Filed: Dec. 12, 2018

(65) Prior Publication Data
US 2020/0189749 A1    Jun. 18, 2020

(51) Int. Cl.
B64D 13/04     (2006.01)
B64D 13/08     (2006.01)
B64D 13/06     (2006.01)

(52) U.S. Cl.
CPC ...... B64D 13/08 (2013.01); *B64D 2013/0618* (2013.01); *B64D 2013/0648* (2013.01)

(58) Field of Classification Search
CPC ............ B64D 13/04; B64D 2013/0603; B64D 2013/0618; B64D 13/00; B64D 13/06; B64D 2013/003; B60H 1/3442
USPC .................. 454/71, 76; 62/DIG. 5; 244/118.5
See application file for complete search history.

(56) References Cited

U.S. PATENT DOCUMENTS

| 5,461,882 | A | 10/1995 | Zywiak | |
|---|---|---|---|---|
| 8,973,867 | B2 | 3/2015 | Eichholz et al. | |
| 9,254,920 | B2 | 2/2016 | Zhou et al. | |
| 9,669,936 | B1 | 6/2017 | Fiterman et al. | |
| 2014/0080397 | A1* | 3/2014 | Surawski | B64D 13/08 454/71 |
| 2015/0065023 | A1* | 3/2015 | Bruno | F02C 6/08 454/71 |
| 2016/0083100 | A1* | 3/2016 | Bammann | B64D 13/06 62/89 |
| 2016/0231031 | A1* | 8/2016 | Bruno | F02C 7/141 |
| 2017/0305556 | A1* | 10/2017 | Bruno | B64D 13/08 |
| 2017/0341766 | A1 | 11/2017 | Bruno et al. | |
| 2018/0057170 | A1* | 3/2018 | Sautron | F02C 6/08 |
| 2018/0237144 | A1 | 8/2018 | Bruno et al. | |

(Continued)

FOREIGN PATENT DOCUMENTS

| EP | 2591999 A2 | 5/2013 |
|---|---|---|
| EP | 2939927 A1 | 11/2015 |
| EP | 3187417 A1 | 7/2017 |

(Continued)

OTHER PUBLICATIONS

Extended European Search Report; International Application No. 19215126.4-1010; International Filing Date: Dec. 11, 2019; dated Apr. 23, 2020; 9 pages.

*Primary Examiner* — Ko-Wei Lin
(74) *Attorney, Agent, or Firm* — Cantor Colburn LLP

(57) ABSTRACT

An environmental control system of an aircraft including a compression device including a compressor having a compressor inlet and a compressor outlet, a primary inlet for supplying a first medium to the compressor inlet, and a secondary inlet for supplying a second medium to the compressor inlet.

18 Claims, 3 Drawing Sheets

(56) References Cited

U.S. PATENT DOCUMENTS

2019/0039738 A1\* 2/2019 Lo .......................... B64D 13/02

FOREIGN PATENT DOCUMENTS

| EP | 3249196 A1 | 11/2017 |
| EP | 3354573 A1 | 8/2018 |
| FR | 2991725 A1 | 6/2011 |
| WO | 2015055672 A1 | 4/2015 |

\* cited by examiner

ALTERNATE FRESH AIR COMPRESSOR INTAKE FOR ENVIRONMENTAL CONTROL SYSTEM

BACKGROUND

Embodiments of the present disclosure pertain to the art of environment control systems and, more specifically, to a compressor of an air cycle machine of an aircraft environmental control system.

Passenger aircrafts are typically equipped with an environmental control system (ECS) for cooling the passenger cabin. Environmental control systems may use pressurized air that is bled from an aircraft engine and/or fresh air from outside the aircraft. The fresh air is typically supplied to a compressor operable to raise the air pressure, such as to the desired pressure for the passenger cabin. The inlet used to provide deliver air to the compressor may become blocked due foreign object debris and/or the formation of ice. When the flow rate of the air provided to the compressor falls due to such blockages, the compressor surges, which may potentially damage the environmental control system.

BRIEF DESCRIPTION

According to an embodiment, an environmental control system of an aircraft including a compression device including a compressor having a compressor inlet and a compressor outlet, a primary inlet for supplying a first medium to the compressor inlet, and a secondary inlet for supplying a second medium to the compressor inlet.

In addition to one or more of the features described above, or as an alternative, in further embodiments the first medium and the second medium are drawn from a same source.

In addition to one or more of the features described above, or as an alternative, in further embodiments the first medium and the second medium includes fresh, outside air.

In addition to one or more of the features described above, or as an alternative, in further embodiments the first medium and the second medium are drawn from separate sources.

In addition to one or more of the features described above, or as an alternative, in further embodiments the environmental control system further comprises a ram air circuit and the second medium is ram air drawn from the ram air circuit.

In addition to one or more of the features described above, or as an alternative, in further embodiments the compression device further comprises a turbine coupled to the compressor by a shaft, wherein the compressor receives energy derived from a cabin discharge air medium expanded across the turbine.

In addition to one or more of the features described above, or as an alternative, in further embodiments the second medium includes cabin discharge air drawn from upstream of the turbine.

In addition to one or more of the features described above, or as an alternative, in further embodiments the second medium includes cabin discharge air output from the turbine.

In addition to one or more of the features described above, or as an alternative, in further embodiments the second medium is drawn from a compartment of the aircraft within which the compressor is mounted.

In addition to one or more of the features described above, or as an alternative, in further embodiments the primary inlet is fluidly coupled to the compressor inlet by a conduit, and the secondary inlet is fluidly coupled to the conduit.

In addition to one or more of the features described above, or as an alternative, in further embodiments comprising a valve mounted within the conduit to control a supply of at least one of the first medium and second medium to the compressor inlet.

In addition to one or more of the features described above, or as an alternative, in further embodiments the valve is a check valve operable to allow a flow of the second medium to the compressor inlet when a pressure of a flow of the first medium is below a threshold.

In addition to one or more of the features described above, or as an alternative, in further embodiments comprising a controller operable to move the valve between a plurality of positions to control the supply of at least one of the first medium and second medium to the compressor inlet.

In addition to one or more of the features described above, or as an alternative, in further embodiments comprising a sensor for measuring a parameter of a flow of the first medium, wherein the controller is coupled to the sensor and is configured to adjust a position of the valve in response to the measured parameter.

In addition to one or more of the features described above, or as an alternative, in further embodiments the measured parameter is flow rate.

In addition to one or more of the features described above, or as an alternative, in further embodiments the measured parameter is pressure.

According to another embodiment, a method of operating a compression device including expanding a medium across a turbine to operate a compressor coupled to the turbine, providing a first medium from a primary inlet to an inlet of the compressor, and providing a second medium from a secondary inlet to the inlet of the compressor if a flow of the first medium is below a threshold.

In addition to one or more of the features described above, or as an alternative, in further embodiments providing the second medium from the secondary inlet to the inlet of the compressor further comprises operating a valve to fluidly couple the secondary inlet to the inlet of the compressor.

In addition to one or more of the features described above, or as an alternative, in further embodiments providing the second medium from the secondary inlet to the inlet of the compressor further comprises operating a valve to fluidly disconnect the primary inlet from the inlet of the compressor.

In addition to one or more of the features described above, or as an alternative, in further embodiments comprising sensing a parameter associated with the first medium, wherein providing the second medium from the secondary inlet to the inlet of the compressor occurs in response to sensing the parameter associated with the first medium.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
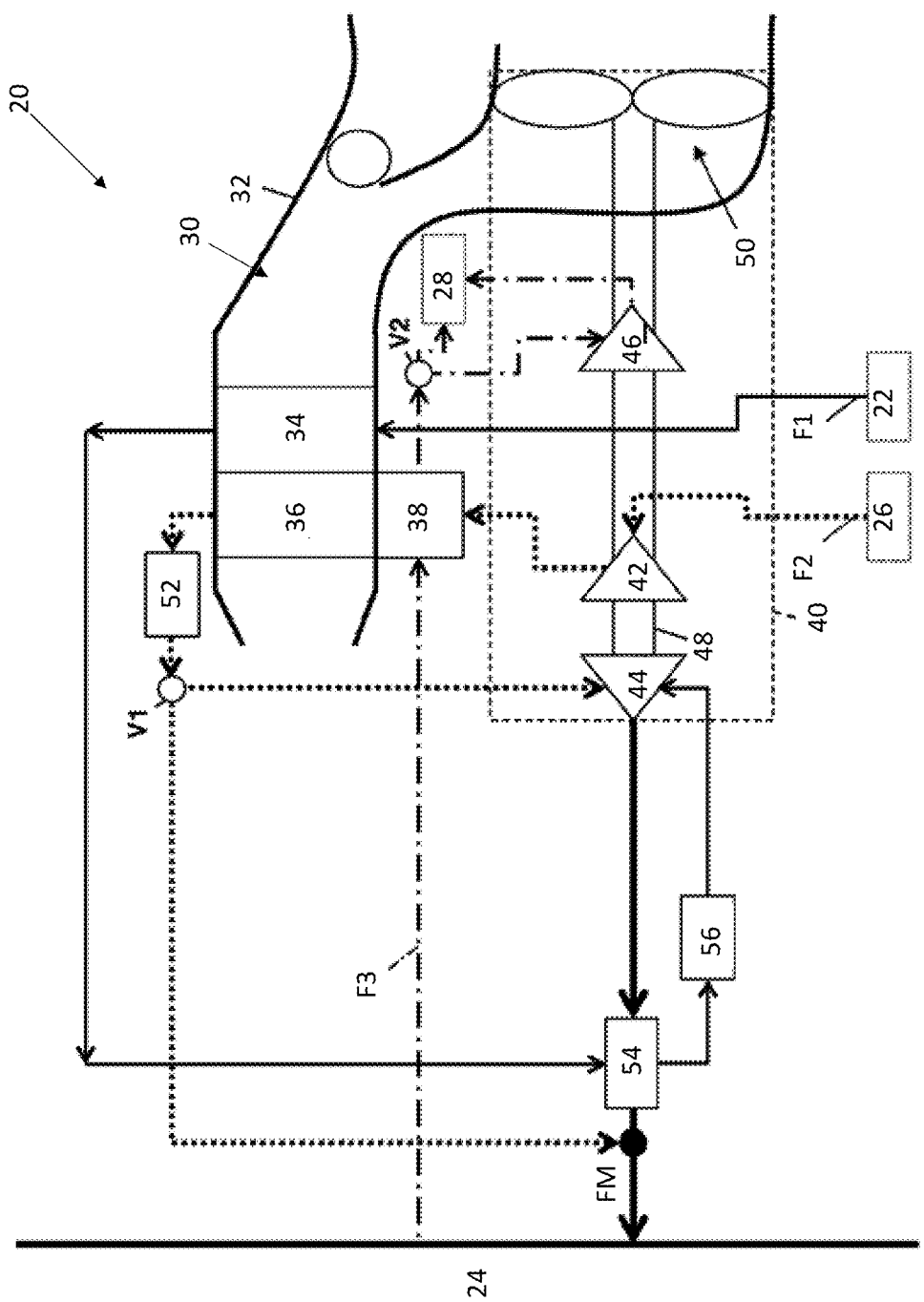
FIG. 1 is a schematic diagram of an example of an environmental control system of an aircraft.

With reference now to FIG. 1, a schematic diagram of an example of an environment control system (ECS) 20 is depicted according to a non-limiting embodiment. Although the ECS 20 is described with reference to an aircraft, alternative applications are also within the scope of the disclosure.

As shown in the FIG. 1, the ECS 20 can receive a first medium F1 from a first inlet 22 and provide a conditioned form of the first medium F1 to a volume 24. The conditioned form of the first medium F1 provided to the volume 24 may be independent, or alternatively, may be a portion of a mixed medium. In embodiments where the ECS 20 is used in an aircraft application, the first medium F1 may be bleed air, which is pressurized air supplied to or originating from, i.e. being "bled" from, an engine or auxiliary power unit of the aircraft. Note that one or more of the temperature, humidity, and pressure of the bleed air can vary based upon a compressor stage and revolutions per minute of the engine.

The ECS 20 can receive a second medium F2 from a second inlet 26 and provide a conditioned form of the second medium F2 to the volume 24, for example as a portion of the mixed medium. In an embodiment, the second medium F2 is fresh air, such as outside air for example. The outside air can be procured via one or more scooping mechanisms, such as an impact scoop or a flush scoop for example. Thus, the second inlet 26 can be considered a fresh air inlet or an outside air inlet. Generally, the fresh air F2 described herein is at an ambient pressure outside of the aircraft with respect to altitude.

In the illustrated, non-limiting embodiment, the ECS 20 can further receive a third medium F3 from the volume 24, as indicated by the dot-dashed-lined arrows. In an embodiment, the third medium F3 is cabin discharge air, which is air leaving the volume 24 and is discharged overboard. For example, the cabin discharge air F3 can be supplied to a destination, such as an outlet 28. Examples of the outlet 28 can include, but are not limited to, a ram circuit and/or an outflow valve (which exhaust overboard).

The ECS 20 is configured to extract work from the third medium F3. In this manner, the pressurized air of the volume 24 can be utilized by the ECS 20 to achieve certain operations required at different altitudes. Thus, based on modes of operation, the ECS 20 can mix the first medium F1, the second medium F2, and/or the third medium F3 to produce a mixed medium FM. The mixed medium FM can be mixed air that meets fresh air requirements set by aviation organizations.

The environmental control system (ECS) 20 includes a RAM air circuit 30 including a shell or duct 32 within which one or more heat exchangers are located. The shell 32 can receive and direct a medium, such as ram air for example, through a portion of the ECS 20. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

The one or more heat exchangers arranged within the shell 32 may be referred to as ram heat exchangers. As shown in the illustrated, non-limiting embodiment, the ram heat exchangers include a primary heat exchanger 34 and a secondary heat exchanger 36. Within the primary and secondary heat exchangers 34, 36, ram air, such as outside air for example, acts as a heat sink to cool the first medium F1, for example bleed air, and/or the second medium F2, for example fresh air. In a non-limiting embodiment, an exhaust of the cabin discharge air F3 can be released through the shell 32 of the ram air circuit 30 and used in conjunction with or in place of the ram air.

The ECS 20 may additionally include an outflow heat exchanger 38. In the illustrated, non-limiting embodiment, the outflow heat exchanger 38 is arranged upstream from the secondary heat exchanger 36 such that in at least one mode of operation of the system, initial cooling of the second medium F2 is performed within the outflow heat exchanger 38 and secondary cooling of the second medium F2 is performed in the secondary heat exchanger 36. In an embodiment, the third medium F3, such as exhaust of cabin air for example, is recirculated to the ECS 20 from the pressurized volume 24, through a valve (not shown). As shown, the third medium F3 may be selectively provided to the outflow heat exchanger 38, where heat is transferred to the third medium F3 via a heat exchange relationship with the second medium F2, before being provided to another component of the system 20 or being exhausted overboard.

The ECS 20 includes a compressing device 40 arranged in fluid communication with the ram air circuit 30. Each compressing device 40 of the ECS 20 is a mechanical device that includes components for performing thermodynamic work on a medium (e.g., extracts work from or applies work to the first medium F1, the second medium F2, and/or the third medium F3 by raising and/or lowering pressure and by raising and/or lowering temperature). Examples of the compressing device 40 include an air cycle machine, a three-wheel air cycle machine, a four-wheel air cycle machine, etc.

As shown, the compressing device 40 includes a compressor 42, a turbine 44, a power turbine 46, operably coupled via a shaft 48. The compressor 42 is a mechanical device that raises a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 42 is configured to receive and pressurize the second medium F2 from the second inlet 26.

The turbine 44 and the power turbine 46 are mechanical devices that expand and extract work from a medium (also referred to as extracting energy). In the compressing device 40, the turbines 44, 46 drive the compressor 42 via the shaft 48. The turbine 44 can be a dual entry turbine, as shown, that includes a plurality of inlet gas flow paths, such as an inner flow path and an outer flow path, to enable mixing of alternative medium flows at the exit of the turbine. The inner flow path can be a first diameter, and the outer flow path can be a second diameter. The power turbine 46 can provide power assist to the turbine based on a mode of operation the system. In a non-limiting embodiment, the turbine 44 can comprise a first nozzle configured to accelerate the first medium F1 for entry into a turbine impeller and a second nozzle is configured to accelerate the second medium F2 for entry into the turbine impeller. The turbine impeller (not shown) can be configured with a first gas path configured to receive the first medium F1 from the first nozzle and with a second gas path configured to receive the second medium F2 from the second nozzle.

The compression device 40 additionally includes a fan 50 mounted to the shaft 48, and associated with the ram air circuit 30 of the ECS 20. The fan 50 is a mechanical device that can force via push or pull methods a medium (e.g., ram air) through the shell 32 across the primary and secondary heat exchangers 34, 36 and at a variable cooling to control temperatures. Operation of the compression device, specifically rotation of the shaft 48 about its axis, would operate the fan 50, which would draw air, such as ram air for example, through the ram air circuit 30 and discharge the air overboard.

In the illustrated, non-limiting embodiment, the ECS 20 also includes a water extractor 52, a condenser 54, and another water extractor 56. The water extractors 52, 56 are mechanical devices that perform a process of taking water from a medium. The condenser 54 is particular type of heat exchanger. In a non-limiting embodiment, a condenser and/or a water extractor can combine to be a high pressure water separator that removes moisture at a highest pressure within an ECS (e.g., downstream of the primary heat exchanger 34). A low-pressure water separator removes moisture at a lowest pressure within an ECS, such as at a turbine discharge pressure (e.g., mixed air exiting the turbine 44).

The elements of the ECS 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system can be regulated to a desired value. For instance, a valve V1 controls whether a flow of the second medium F2 from the secondary heat exchanger 36 bypasses the condenser 56 in accordance with a mode of the ECS 20. Further, a valve V2 controls whether a flow of the third medium F3 from the volume 24 bypasses the power turbine 46 in accordance with a mode of the system 20. Note that a combination of components and elements of the ECS 20 can be referred to as an air conditioning pack or a pack. The pack can exist between the first inlet 22, the volume 24, the second inlet 26, the outlet 28, and an exhaust of the shell 32. It should be understood that the ECS 20 illustrated and described herein is intended as an example only, and that other configurations of the ECS 20 are also within the scope of the disclosure.

Figure 2:
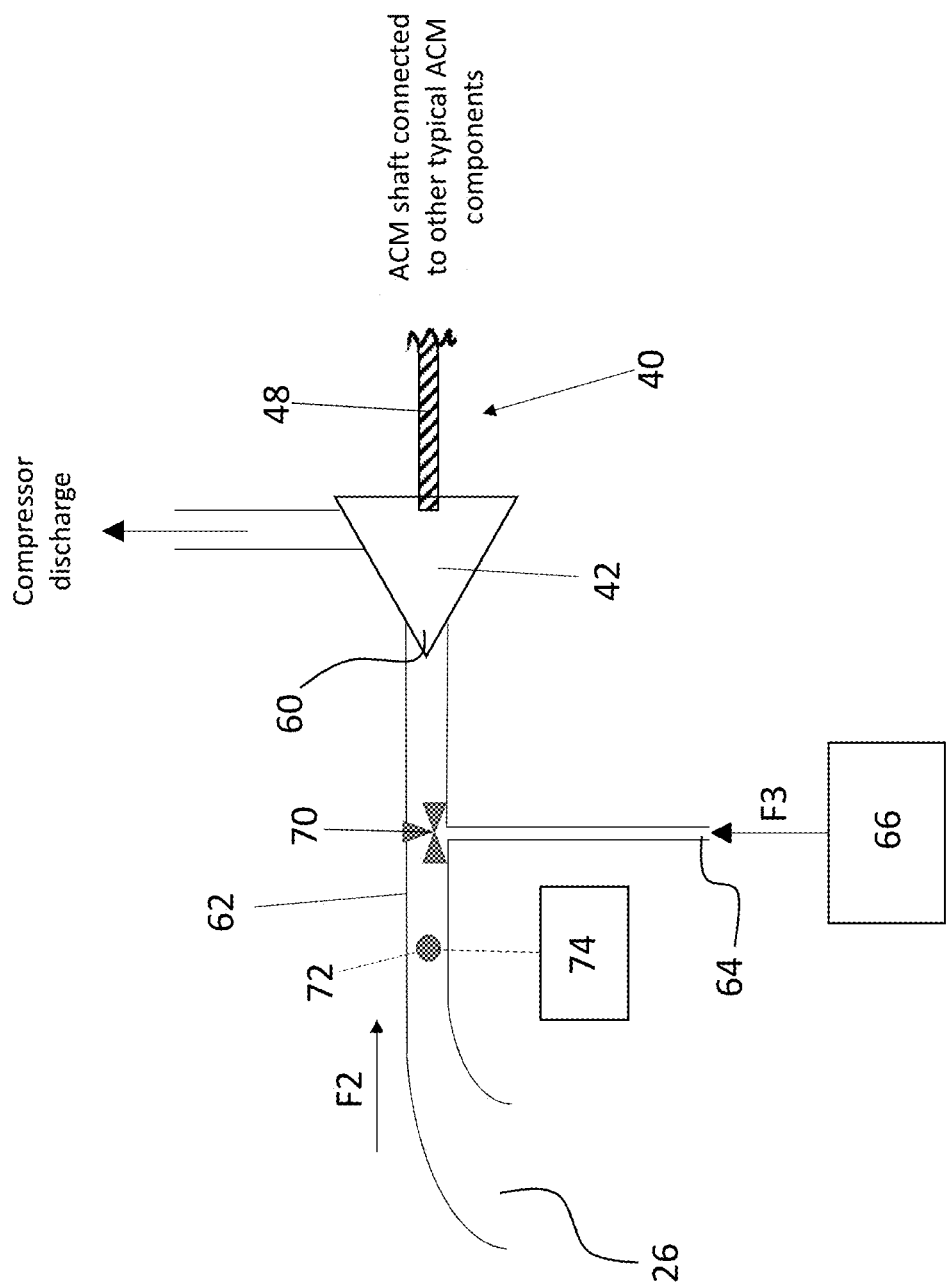
FIG. 2 is a schematic diagram of a portion of an environment control system of an aircraft according to an embodiment.

With reference now to FIG. 2, the compressor 42 of the compression device 40 is illustrated in more detail. As previously described, a second medium F2, such as fresh air for example, enters the system 20 from a second inlet 26. The second inlet 26 is arranged in fluid communication with an inlet 60 of the compressor 42 via a conduit, illustrated at 62. If the second inlet 26 of the ECS 20, were to become blocked, thereby restricting the flow of the second medium F2 provided to the compressor 42, a failure of the compressor 42, i.e. such as a surge for example, may occur, potentially resulting in damage to the ECS 20. For example, the second inlet 26 may be blocked by foreign objects or debris drawn into the scoop, or alternatively, by the accumulation of ice thereon.

To reduce the likelihood of the occurrence of a compressor surge condition, the ECS 20 may additionally include another inlet 64 for providing a medium from a source 66 to the inlet 60 of the compressor 42. Accordingly, the second inlet 26 may be considered a primary inlet for supplying a medium the compressor 42 and the inlet 64 may be considered a secondary inlet for supplying a medium to the compressor 42. In the illustrated, non-limiting embodiment, the secondary or additional inlet 64 is connected to the conduit 62 at a position downstream from the primary inlet 26, and upstream from the inlet 60 of the compressor 42. However, embodiments where the secondary inlet 64 is directly connected to the inlet 60 of the compressor 42 are also within the scope of the disclosure. In embodiments where the secondary inlet 64 is directly coupled to the compressor 42, the compressor 42 may include a plurality of inlet openings, i.e. a first inlet opening (not shown) for receiving the second medium F2 from the primary inlet 26, and a second inlet opening (not shown) for receiving a medium from the secondary inlet 64.

In an embodiment, the secondary inlet 64 is configured to provide additional fresh air (i.e. ambient pressure, outside air) to the compressor 42. In such embodiments, the secondary inlet 64 may include one or more scooping mechanisms, such as an impact scoop or a flush scoop for example. In such embodiments, a configuration of one or more scooping mechanisms at the secondary inlet 64 may be substantially identical to, or may have a configuration than the one or more scooping mechanisms of the primary inlet 26. Alternatively, the secondary inlet 64 may be configured to draw air form the interior of the aircraft bay within which the compressor is mounted.

Figure 3:
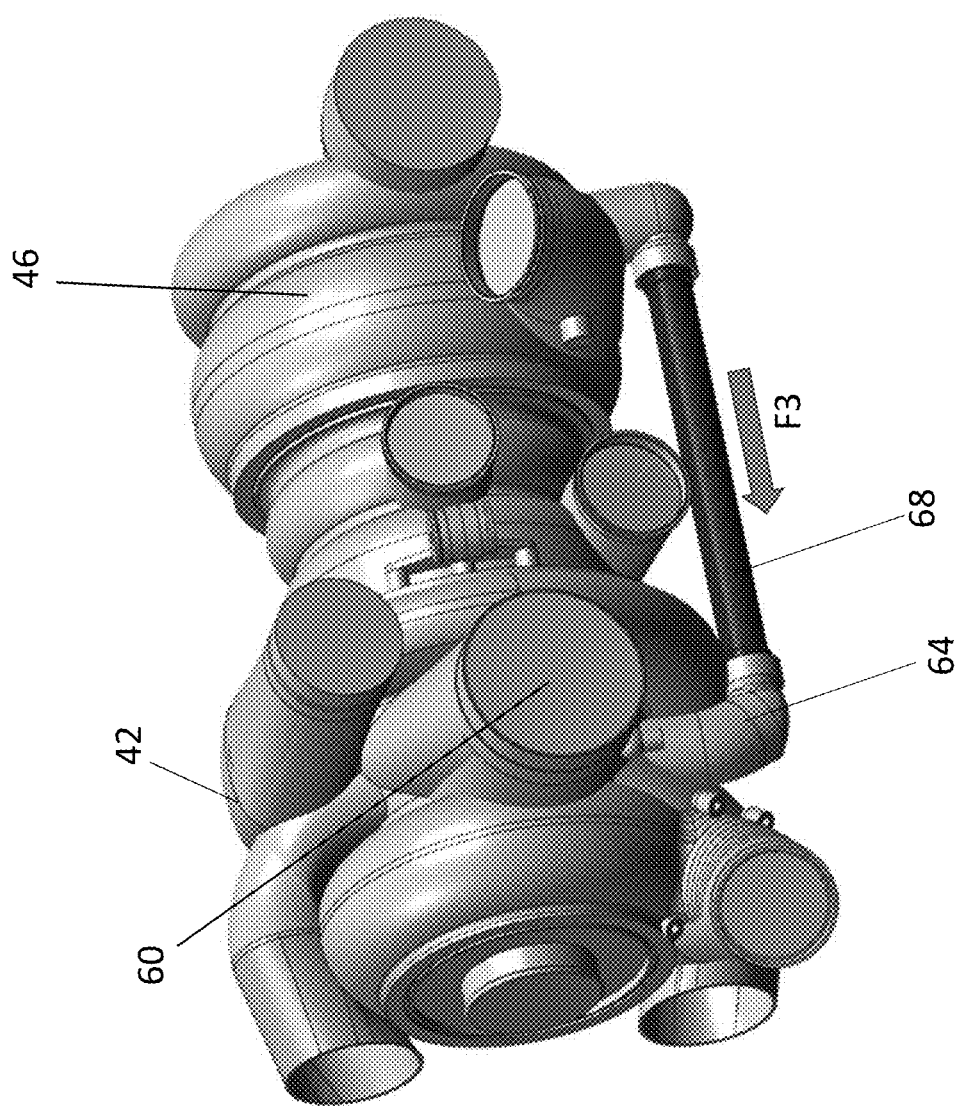
FIG. 3 is a perspective view of a portion of an air cycle machine of an environment control system of an aircraft according to an embodiment.

In other embodiments, the source 66 configured to supply an additional flow of medium to the compressor 42 via the secondary inlet 64 may be another component within the ECS 20. For example, in an embodiment, secondary inlet 64 may be configured to draw ram air from the ram air circuit 30. In an embodiment, the secondary inlet 64 is configured to draw ram air from within the shell 32 at a position located upstream from the primary and secondary heat exchangers 34, 36 with respect to the flow of ram air through the ram air circuit 30. In another embodiment, a portion of the air supplied to the power turbine 46 of the compression device 40 may be used as the source 66 for delivering additional air to the compressor 42. For example, as best shown in FIG. 3, a portion of the third medium F3 either provided to or output from the power turbine 46 may be rerouted to the secondary inlet 64 via a conduit, illustrated at 68.

With reference again to FIG. 2, the medium from the secondary inlet 64 may be provided to the compressor 42 in addition to, or in place of, the medium from the primary inlet 26. As shown, a valve 70 may be positioned at the interface between the secondary inlet 64 and the conduit 62 extending from the primary inlet 26 to the compressor 42. In an embodiment, the valve 70 may be a check valve. Accordingly, when the pressure of the second medium F2 provided via the primary inlet 26 exceeds a pressure threshold of the valve 70, the valve 70 is configured to allow a flow of second medium F2 from the primary inlet 26, but not a flow of medium from the secondary inlet 64, to the compressor 42. Once the primary inlet 26 becomes at least partially blocked, the pressure of the flow of second medium F2 is reduced. If the pressure of the flow of second medium F2 is less than the pressure threshold of the valve 70, the valve 70 will transition to allow the medium from the secondary inlet 64 to flow to the compressor 42. In the embodiment that valve 70 is absent from the system, flow to the compressor 42 inlet will be supplied by the higher pressure source between primary inlet 26, less the pressure drop from the partial blockage, and secondary inlet 64.

Alternatively, the valve 70 may be a control operated valve, movable between a plurality of positions. For example, in a first position, only the primary inlet 26 is arranged in fluid communication with the compressor 42, in a second position, only the secondary inlet 64 is in fluid communication with the compressor 42, and in a third position, both the primary and the secondary inlets 26, 64 are in fluid communication with the compressor 42. In an embodiment, a sensor 72 is operable to monitor one or more parameters of the flow provided via the primary inlet 26. The sensor 72 may be operable to measure a flow rate or pressure for example. Using the sensor data, a controller 74 operably coupled to the sensor 72 and the valve 70, can determine whether the flow from the primary inlet 26 is sufficient to meet the demand of the compressor 42, and can adjust the position of the valve 70 accordingly to avoid a surge condition.

An ECS 20 having both a primary and secondary inlet 26, 64 for delivering a supply of air to the compressor 42, as illustrated and described herein has an increased reliability compared to existing systems. By allowing the compressor 42 to pull air from another source when the primary inlet 26 is blocked, the likelihood of a compressor surge is reduced or eliminated.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system of an aircraft comprising:
    a compression device including a compressor having a compressor inlet and a compressor outlet, and a turbine operably coupled to the compressor by a shaft, wherein energy extracted from a first medium within the turbine is used to drive the compressor;
    a primary inlet supplying a second medium to the compressor inlet; and
    a secondary inlet supplying a third medium to the compressor inlet, wherein the third medium is cabin discharge air, wherein the third medium is provided to the compressor inlet separately from the second medium when a pressure of the second medium is below a threshold.

2. The environmental control system of claim 1, wherein a source of the second medium and a source of the third medium are the same.

3. The environmental control system of claim 1, wherein the second medium includes fresh, outside air.

4. The environmental control system of claim 1, wherein a source of the second medium is different than a source of the third medium.

5. The environmental control system of claim 4, wherein the compressor receives energy derived from a flow of the third medium expanded across the turbine.

6. The environmental control system of claim 5, wherein the source of the third medium is arranged upstream from the turbine.

7. The environmental control system of claim 5, wherein the source of the third medium is arranged at or downstream from an outlet of the turbine.

8. The environmental control system of claim 1, wherein the primary inlet is fluidly coupled to the compressor inlet by a conduit, and the secondary inlet is fluidly coupled to the conduit.

9. The environmental control system of claim 8, further comprising a valve mounted within the conduit to control a supply of at least one of the second medium and the third medium to the compressor inlet.

10. The environmental control system of claim 9, wherein the valve is a check valve operable to allow the third medium to flow to the compressor inlet when the pressure of the second medium is below the threshold.

11. The environmental control system of claim 9, further comprising a controller operable to move the valve between a plurality of positions to control the supply of at least one of the second medium and the third medium to the compressor inlet.

12. The environmental control system of claim 11, further comprising a sensor for measuring a parameter of a flow of the second medium, wherein the controller is coupled to the sensor and is configured to adjust a position of the valve in response to the measured parameter.

13. The environmental control system of claim 12, wherein the measured parameter is flow rate.

14. The environmental control system of claim 12, wherein the measured parameter is pressure.

15. A method of operating a compression device comprising:
    expanding a medium across a turbine to operate a compressor coupled to the turbine;
    providing a second medium from a primary inlet to an inlet of the compressor; and
    providing a third medium from a secondary inlet to the inlet of the compressor, wherein a pressure of the second medium is below a threshold, wherein the third medium is cabin discharge air.

16. The method of claim 15, wherein providing the third medium from the secondary inlet to the inlet of the compressor further comprises operating a valve to fluidly couple the secondary inlet to the inlet of the compressor.

17. The method of claim 16, wherein providing the third medium from the secondary inlet to the inlet of the compressor further comprises operating a valve to fluidly disconnect the primary inlet from the inlet of the compressor.

18. The method of claim 16, further comprising sensing a parameter associated with the second medium, wherein providing the third medium from the secondary inlet to the inlet of the compressor occurs in response to sensing the parameter associated with the second medium.

* * * * *